UNITED STATES PATENT OFFICE.

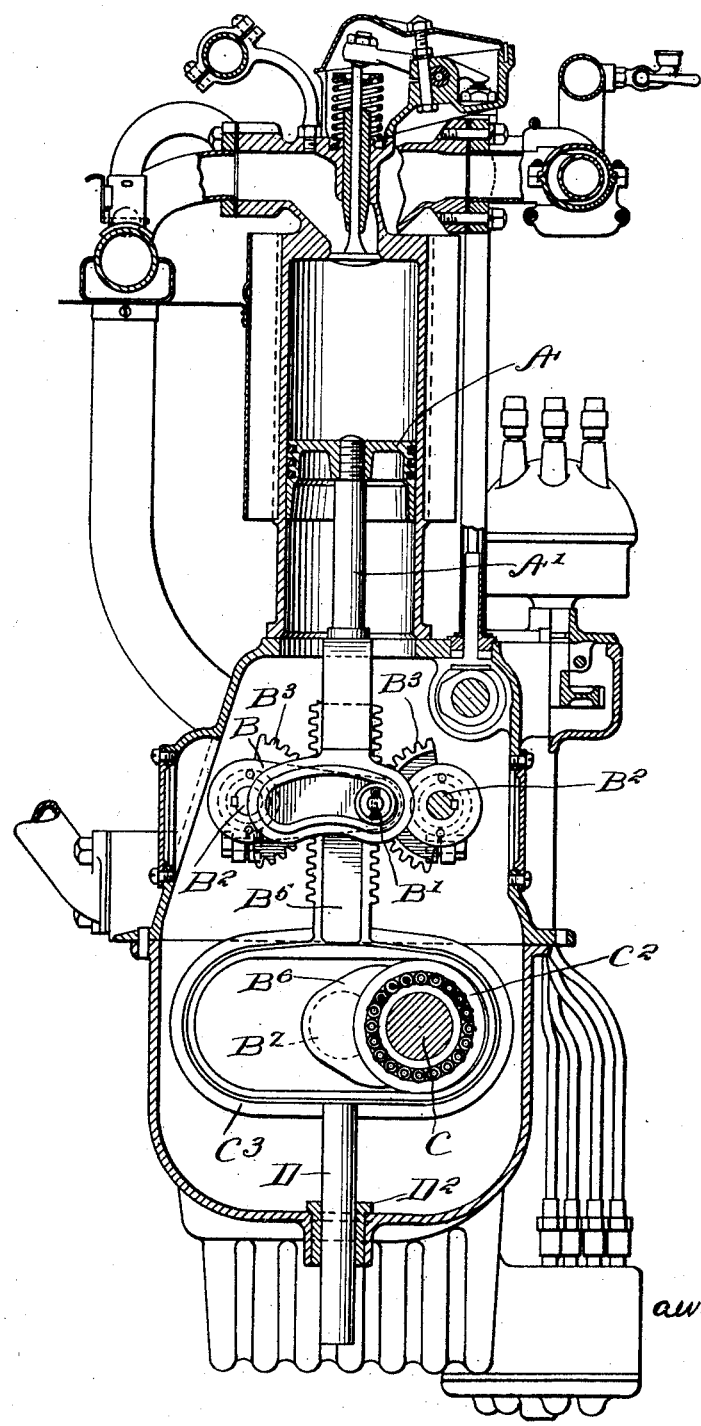

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,340. Specification of Letters Patent. Patented July 12, 1921.

Application filed December 8, 1920. Serial No. 429,174.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines, by which I secure a variation in the movement of the piston with reference to that of the crank, enabling me to gain advantages in the operation of such engines that are not possible with the constructions at present used. This application covers improvements over the forms shown in a series of applications filed with it and bearing Serial Numbers 429,168, 429,170 to 429,173, inclusive, and 429,175, 429,176, and of the same date, but while the general principles are the same, the construction includes novel forms that have particular advantages. In the annexed drawings I show an application of my invention, in which the figure is an elevation.

The arrangement of crank levers and segmental pinions shown is similar to that given in my preceding applications, and the vertical rack follows the general lines previously given, but in the present structure I have modified the structure in a manner now to be described.

In the figure a yoke, $C^3$, carries a roller $C^2$, set on rollers, as shown, to lessen friction. This roller is mounted on the wrist pin C, being free to turn thereon. A bar, D, preferably round, drops from the yoke and passes through a gland, $D^2$, which acts as a guide and supporting means. Another bar, $B^5$, rises from the yoke $C^3$. This bar has teeth cut on each side, these meshing with those of the segmental pinions $B^3$, $B^3$. These pinions are hung on the pins $B^2$, $B^2$, the latter being supported, preferably, in the engine frame. The lever cranks and segmental pinions are keyed to the pins $B^2$, $B^2$, and are rotatable therewith. From the piston A a rod $A^1$ drops to a slotted member. These parts can be formed of one piece, as shown, or can be divided into two parts, but they will be assumed to be one piece, formed to the shape given in the drawing. The slotted portion straddles the pinions, engaging the rollers centered at $B^1$, $B^1$, (only one side is shown in drawing so only one of these rollers appears). It will be noted that the radius of the center of the roller is greater than the radius of the pitch circle of the segmental pinions.

From the preceding it is evident that the movement of the piston will cause a movement of the segmental pinions in a downward direction, assuming piston to be on outstroke, and that the action of the pinions will raise the toothed bar, $B^5$, causing the yoke to move upward and the crank $B^6$ to revolve. The yoke is held in its position by the rod D and gland $D^2$, and also by the toothed portion engaging the segmental pinions. I thus secure a simple and effective means of transmitting power from the piston A to the crank shaft $B^7$ (shown dotted), and the motion of this crank shaft will be governed by the diametral radius of either of the segmental pinions, which may be greater or less than the movement of the piston.

What I believe is new and ask to have protected by Letters Patent, is—

In a transmitting member, the combination of a slotted crosshead guide, a crosshead moving therein, an engine crank, a pin from said crosshead to said engine crank, a vertical toothed bar from said crosshead guide, pinions meshing with said toothed bar, rotatable pins supporting said pinions, levers mounted on said pins and rotatable with the said levers, rollers on said levers, slotted forks engaging said rollers, a yoke supporting said forks, a bar supporting said yoke, an engine piston, and means for attaching said bar to said piston, in the manner and for the purpose hereinbefore described.

In testimony whereof I affix my signature.

ALVAH L. POWELL.